United States Patent
Lent et al.

(10) Patent No.: US 9,034,510 B2
(45) Date of Patent: May 19, 2015

(54) BATTERY PACK AND METHOD OF SECURING A PLURALITY OF BATTERY MODULES IN THE BATTERY PACK

(71) Applicants: Steven Lent, Canton, MI (US); Michael Garascia, Waterford, MI (US)

(72) Inventors: Steven Lent, Canton, MI (US); Michael Garascia, Waterford, MI (US)

(73) Assignee: LG Chem, Ltd., Seoul (KR)

( * ) Notice: Subject to any disclaimer, the term of this patent is extended or adjusted under 35 U.S.C. 154(b) by 325 days.

(21) Appl. No.: 13/625,951

(22) Filed: Sep. 25, 2012

(65) Prior Publication Data

US 2014/0087234 A1    Mar. 27, 2014

(51) Int. Cl.
*H01M 2/10* (2006.01)
*H01M 10/60* (2014.01)

(52) U.S. Cl.
CPC ........ *H01M 2/1016* (2013.01); *Y10T 29/49108* (2015.01); *H01M 2/10* (2013.01); *H01M 10/50* (2013.01); *H01M 2/1061* (2013.01); *H01M 2/1077* (2013.01)

(58) Field of Classification Search
None
See application file for complete search history.

(56) References Cited

U.S. PATENT DOCUMENTS

| | | | |
|---|---|---|---|
| 2,933,548 | A | 4/1960 | Walker |
| 3,866,704 | A | 2/1975 | Bowers et al. |
| 4,936,409 | A | 6/1990 | Nix et al. |
| 5,378,555 | A | 1/1995 | Waters et al. |
| 5,558,949 | A | 9/1996 | Iwatsuki et al. |
| 6,230,834 | B1 | 5/2001 | Van Hout et al. |
| 6,648,090 | B2 | 11/2003 | Iwase |
| 7,125,628 | B2 | 10/2006 | Marukawa et al. |
| 8,110,300 | B2 | 2/2012 | Niedzwiecki et al. |
| 8,465,866 | B2 | 6/2013 | Kim |
| 8,507,121 | B2 * | 8/2013 | Saito et al. ............... 429/120 |
| 2006/0218823 | A1 | 10/2006 | Olmr et al. |
| 2009/0044997 | A1 | 2/2009 | Picavet |
| 2009/0166116 | A1 | 7/2009 | Kiya et al. |

(Continued)

FOREIGN PATENT DOCUMENTS

| | | |
|---|---|---|
| EP | 2450990 A3 | 5/2014 |
| JP | H07232564 A | 9/1995 |

(Continued)

OTHER PUBLICATIONS

U.S. Appl. No. 13/476,089, filed May 21, 2012 entitled Battery Module Mounting Assembly and Method for Mounting a Battery Module to a Base Plate.

(Continued)

*Primary Examiner* — Milton I Cano
*Assistant Examiner* — Carmen Lyles-Irving
(74) *Attorney, Agent, or Firm* — Buckert Patent & Trademark Law Firm, PC; John F. Buckert

(57) ABSTRACT

A battery pack is provided. The battery pack has a base plate and a peripheral side wall extending upwardly from the base plate. The peripheral side wall has first and second side portions disposed at first and second ends, respectively, of the base plate. The battery pack further includes a plurality of battery modules disposed on the base plate between the first and second ends of the base plate along a longitudinal axis of the base plate. The battery pack further includes a first mounting bracket coupled to the first side portion of the peripheral side wall. The battery pack further includes a second mounting bracket having a plate portion, an extension portion extending outwardly from the plate portion, and an elastomeric member disposed on the extension portion.

16 Claims, 11 Drawing Sheets

(56) References Cited

U.S. PATENT DOCUMENTS

| | | |
|---|---|---|
| 2009/0325049 A1 | 12/2009 | Niedzwiecki et al. |
| 2011/0274958 A1* | 11/2011 | Iritani et al. .................. 429/120 |
| 2011/0300421 A1* | 12/2011 | Iritani et al. .................... 429/72 |

FOREIGN PATENT DOCUMENTS

| | | |
|---|---|---|
| JP | 2002343324 A | 11/2002 |
| JP | 2012084239 A | 4/2012 |
| JP | 2012160347 A | 8/2012 |
| KR | 100503853 B1 | 7/2005 |
| WO | 2007100072 A | 9/2007 |
| WO | 2011026984 A1 | 3/2011 |

OTHER PUBLICATIONS

International Search Report for International application No. PCT/KR2013/004349 dated Aug. 27, 2013.

* cited by examiner

| OPERATOR PROVIDES THE BATTERY PACK WITH A BASE PLATE, A PERIPHERAL SIDE WALL, FIRST AND SECOND MOUNTING BRACKETS, AND A TOP COVER PLATE; THE PERIPHERAL SIDE WALL COUPLED TO THE BASE PLATE AND EXTENDING UPWARDLY FROM THE BASE PLATE, THE PERIPHERAL SIDE WALL HAVING FIRST AND SECOND SIDE PORTIONS DISPOSED AT FIRST AND SECOND ENDS, RESPECTIVELY, OF THE BASE PLATE, THE SECOND SIDE PORTION HAVING AN APERTURE EXTENDING THERETHROUGH, THE FIRST MOUNTING BRACKET COUPLED TO THE FIRST SIDE PORTION OF THE PERIPHERAL SIDE WALL, THE SECOND MOUNTING BRACKET HAVING A PLATE PORTION, AN EXTENSION PORTION EXTENDING OUTWARDLY FROM THE PLATE PORTION, AND AN ELASTOMERIC MEMBER DISPOSED ON THE EXTENSION PORTION | 500 |
|---|---|

↓

| OPERATOR DISPOSES A PLURALITY OF BATTERY MODULES ON THE BASE PLATE BETWEEN THE FIRST AND SECOND ENDS OF THE BASE PLATE ALONG A LONGITUDINAL AXIS OF THE BASE PLATE SUCH THAT ONE OF THE PLURALITY OF BATTERY MODULES CONTACT THE FIRST MOUNTING BRACKET | 502 |
|---|---|

↓

| OPERATOR COUPLES THE SECOND MOUNTING BRACKET TO AN OUTER SURFACE OF THE SECOND SIDE PORTION SUCH THAT THE EXTENSION PORTION EXTENDS THROUGH THE APERTURE IN THE SECOND SIDE PORTION AND THE ELASTOMERIC MEMBER CONTACTS ANOTHER ONE OF THE PLURALITY OF BATTERY MODULES TO FIXEDLY COMPRESS THE PLURALITY OF BATTERY MODULES AGAINST ONE ANOTHER BETWEEN THE FIRST MOUNTING BRACKET AND THE SECOND MOUNTING BRACKET ALONG THE LONGITUDINAL AXIS | 504 |
|---|---|

↓

| OPERATOR COUPLES THE TOP COVER PLATE TO A TOP PORTION OF THE PERIPHERAL SIDE WALL TO ENCLOSE THE PLURALITY OF BATTERY MODULES WITHIN AN INTERIOR REGION DEFINED BY THE BASE PLATE, THE PERIPHERAL SIDE WALL, AND THE TOP COVER PLATE | 506 |
|---|---|

FIG. 11

BATTERY PACK AND METHOD OF SECURING A PLURALITY OF BATTERY MODULES IN THE BATTERY PACK

BACKGROUND

The inventors herein have recognized a need for an improved battery battery pack and a method of securing a plurality of battery modules in the battery pack.

SUMMARY

A battery pack in accordance with an exemplary embodiment is provided. The battery pack includes a base plate and a peripheral side wall coupled to the base plate and extending upwardly from the base plate. The peripheral side wall has first and second side portions disposed at first and second ends, respectively, of the base plate. The second side portion has an aperture extending therethrough. The battery pack further includes a plurality of battery modules disposed on the base plate between the first and second ends of the base plate along a longitudinal axis of the base plate. The battery pack further includes a first mounting bracket coupled to the first side portion of the peripheral side wall and configured to contact one of the plurality of battery modules. The battery pack further includes a second mounting bracket having a plate portion, an extension portion extending outwardly from the plate portion, and an elastomeric member disposed on the extension portion. The plate portion of the second mounting bracket is configured to be coupled to an outer surface of the second side portion such that the extension portion extends through the aperture in the second side portion and the elastomeric member contacts another one of the plurality of battery modules to fixedly compress the plurality of battery modules between the first mounting bracket and the second mounting bracket along the longitudinal axis.

A method of securing a plurality of battery modules in a battery pack in accordance with another exemplary embodiment is provided. The method includes providing the battery pack with a base plate, a peripheral side wall, and first and second mounting brackets. The peripheral side wall is coupled to the base plate and extending upwardly from the base plate. The peripheral side wall has first and second side portions disposed at first and second ends, respectively, of the base plate. The second side portion has an aperture extending therethrough. The first mounting bracket is coupled to the first side portion of the peripheral side wall. The second mounting bracket has a plate portion, an extension portion extending outwardly from the plate portion, and an elastomeric member disposed on the extension portion. The method further includes disposing a plurality of battery modules on the base plate between the first and second ends of the base plate along a longitudinal axis of the base plate such that one of the plurality of battery modules contact the first mounting bracket. The method further includes coupling the second mounting bracket to an outer surface of the second side portion such that the extension portion extends through the aperture in the second side portion and the elastomeric member contacts another one of the plurality of battery modules to fixedly compress the plurality of battery modules between the first mounting bracket and the second mounting bracket along the longitudinal axis.

BRIEF DESCRIPTION OF THE DRAWINGS

FIG. 11 is a flow chart of a method of securing a plurality of battery modules in the battery pack of FIG. 1 in accordance with another exemplary embodiment.

DETAILED DESCRIPTION

Figure 1:
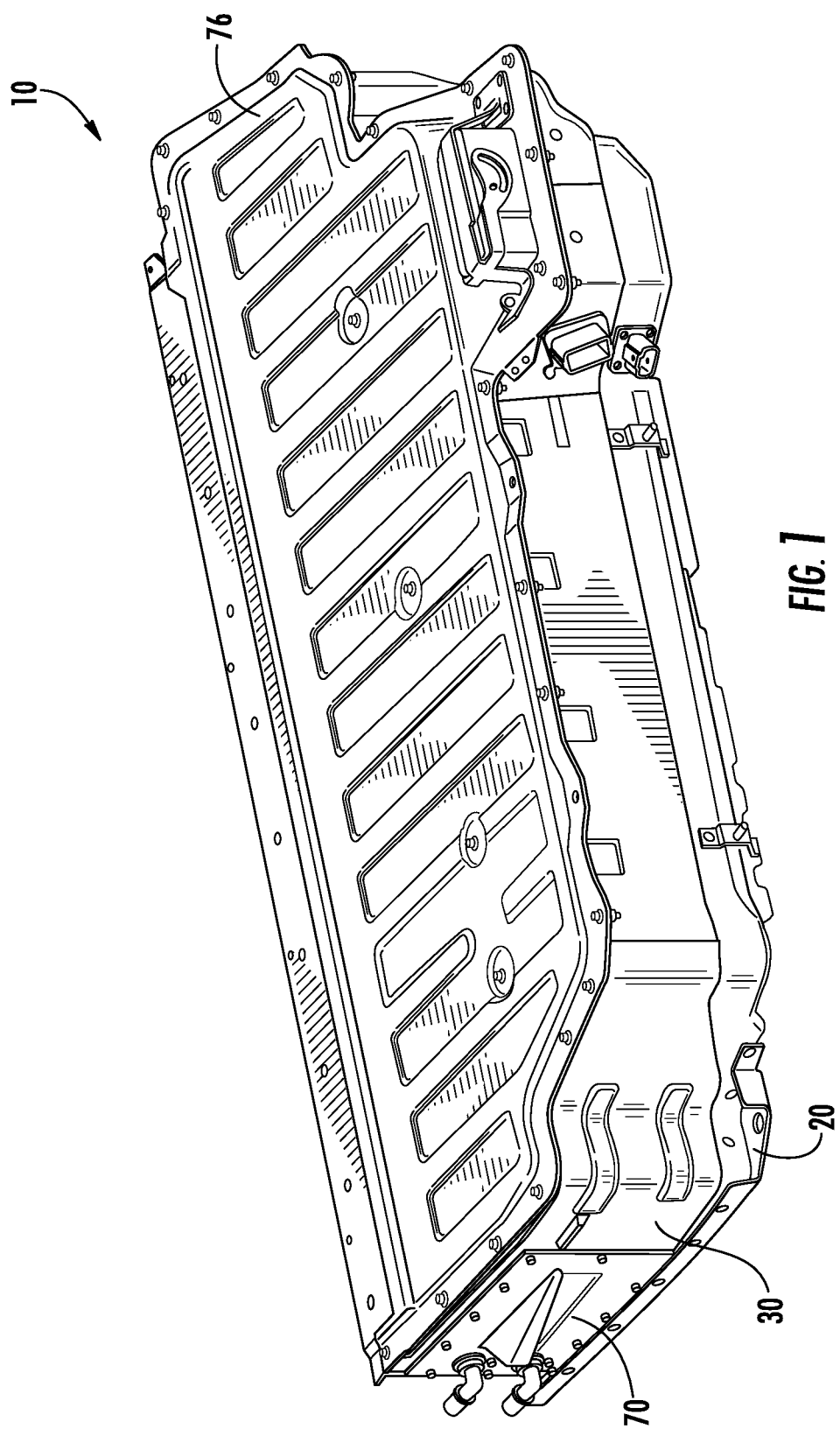
FIG. 1 is a block diagram of a battery pack in accordance with an exemplary embodiment.
Figure 2:
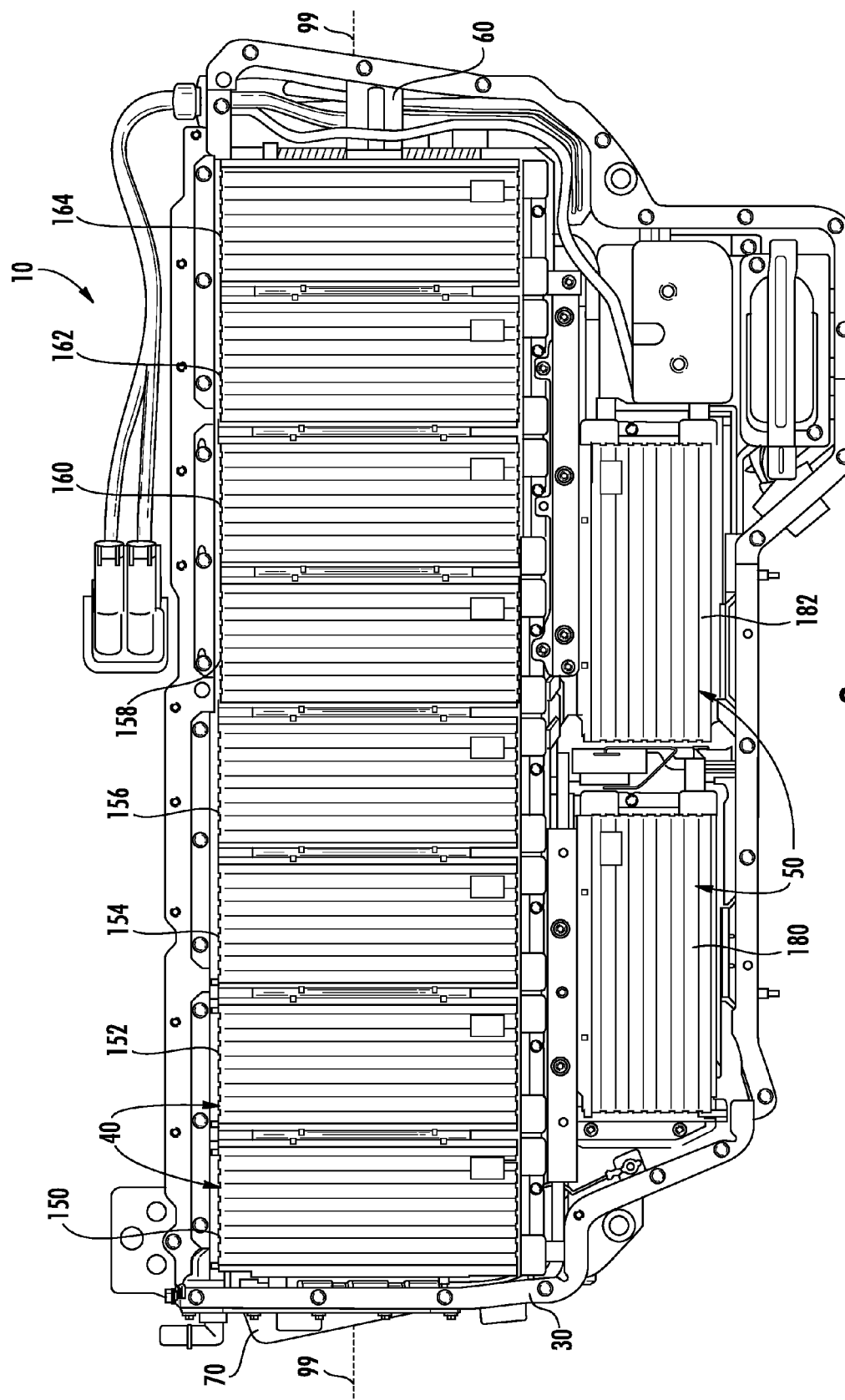
FIG. 2 is a schematic of a top portion of the battery pack of FIG. 1.
Figure 3:
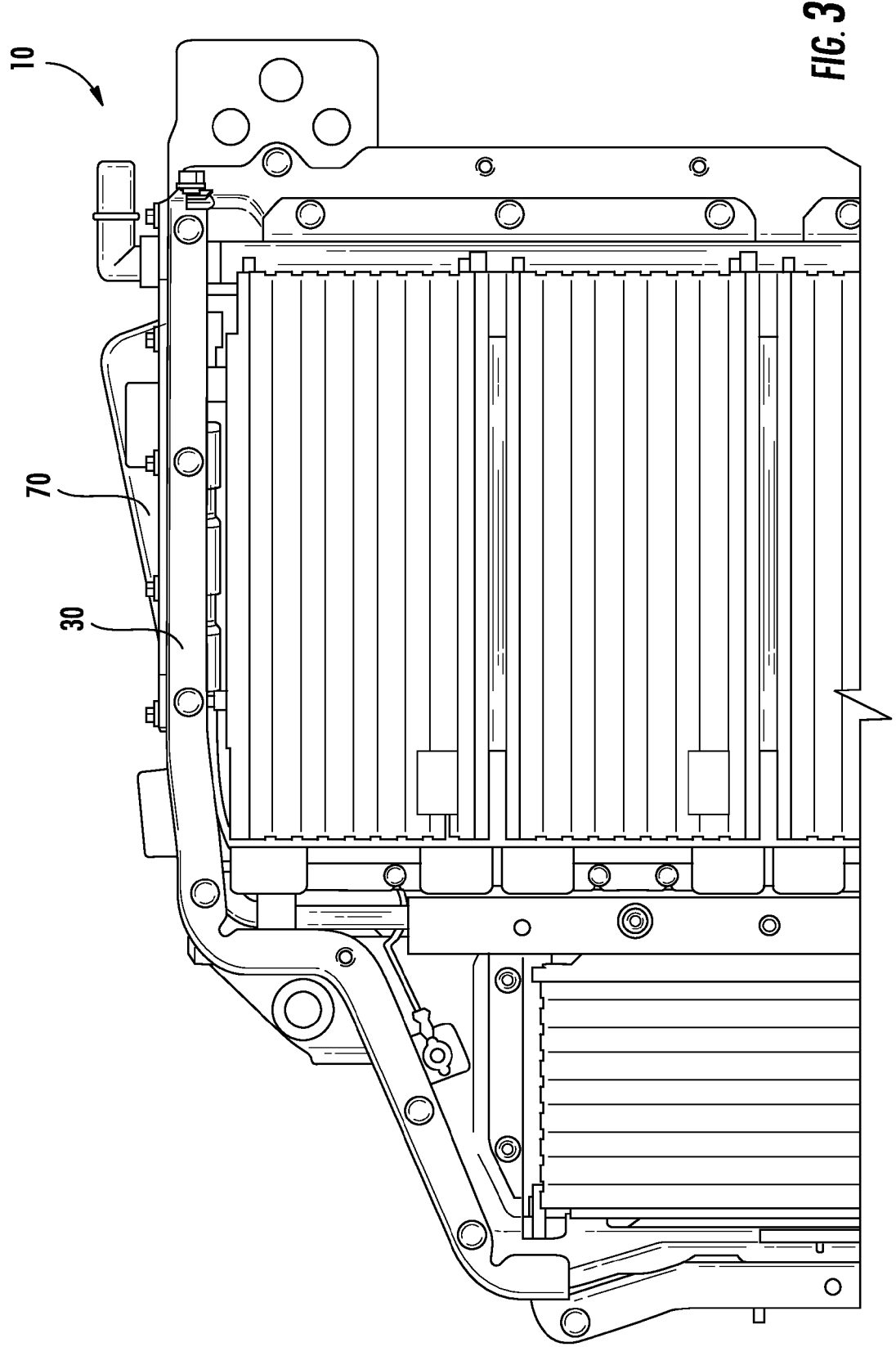
FIG. 3 is a schematic of a portion of the battery pack of FIG. 1.
Figure 4:
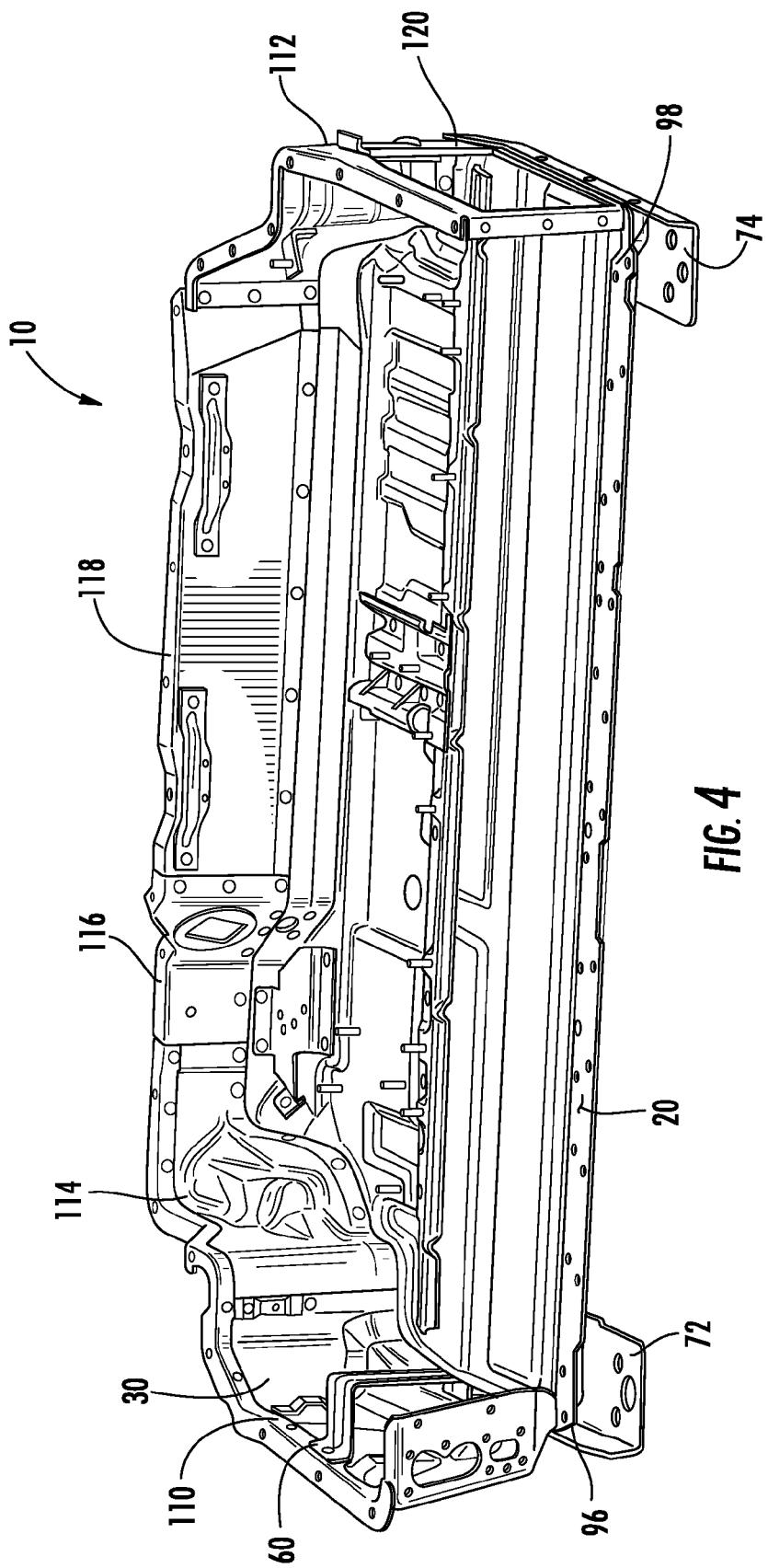
FIG. 4 is a schematic of a portion of the battery pack of FIG. 1 with a top cover plate removed.
Figure 5:
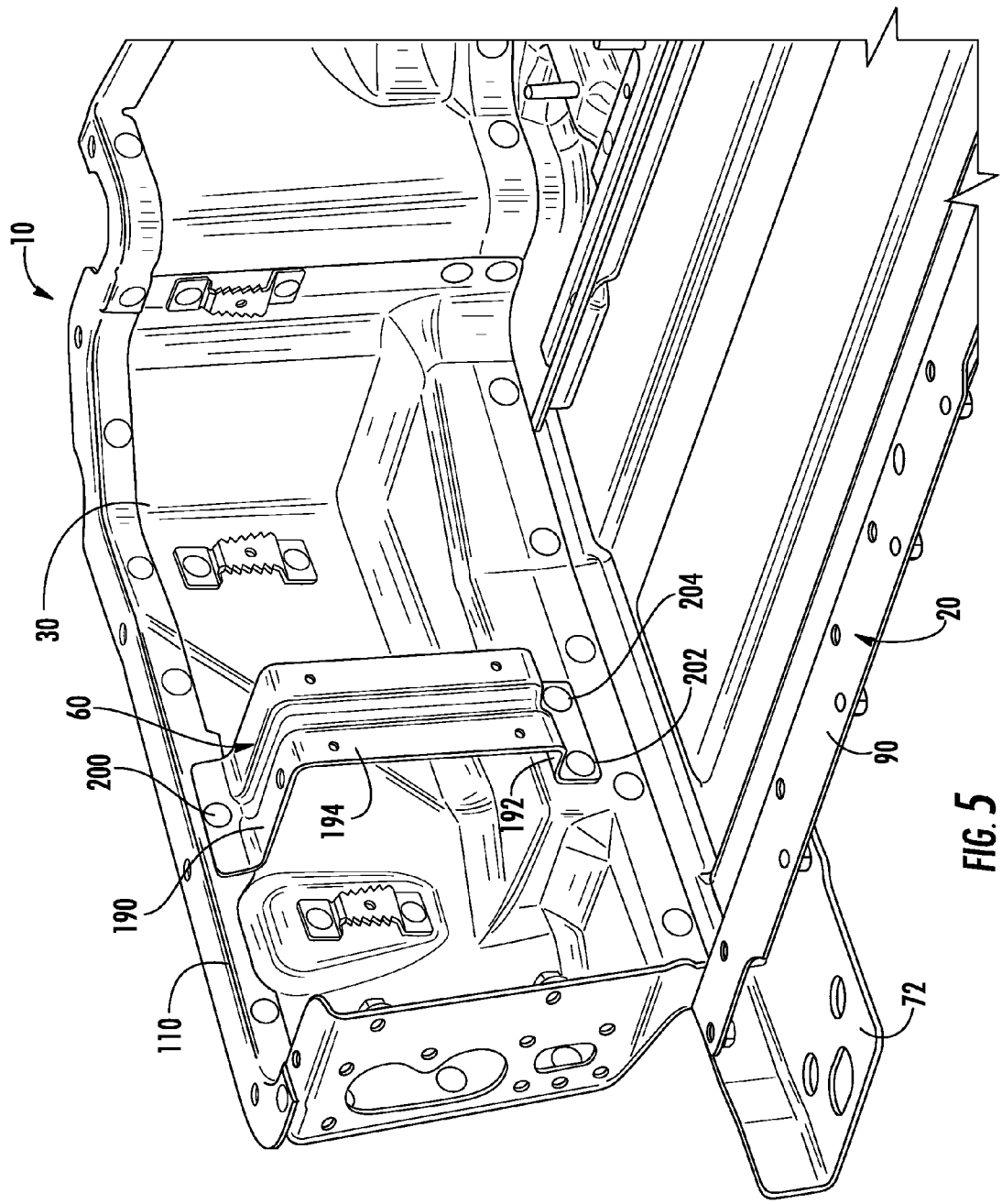
FIG. 5 is a schematic of a portion of the battery pack of FIG. 4 illustrating a first mounting bracket.
Figure 6:
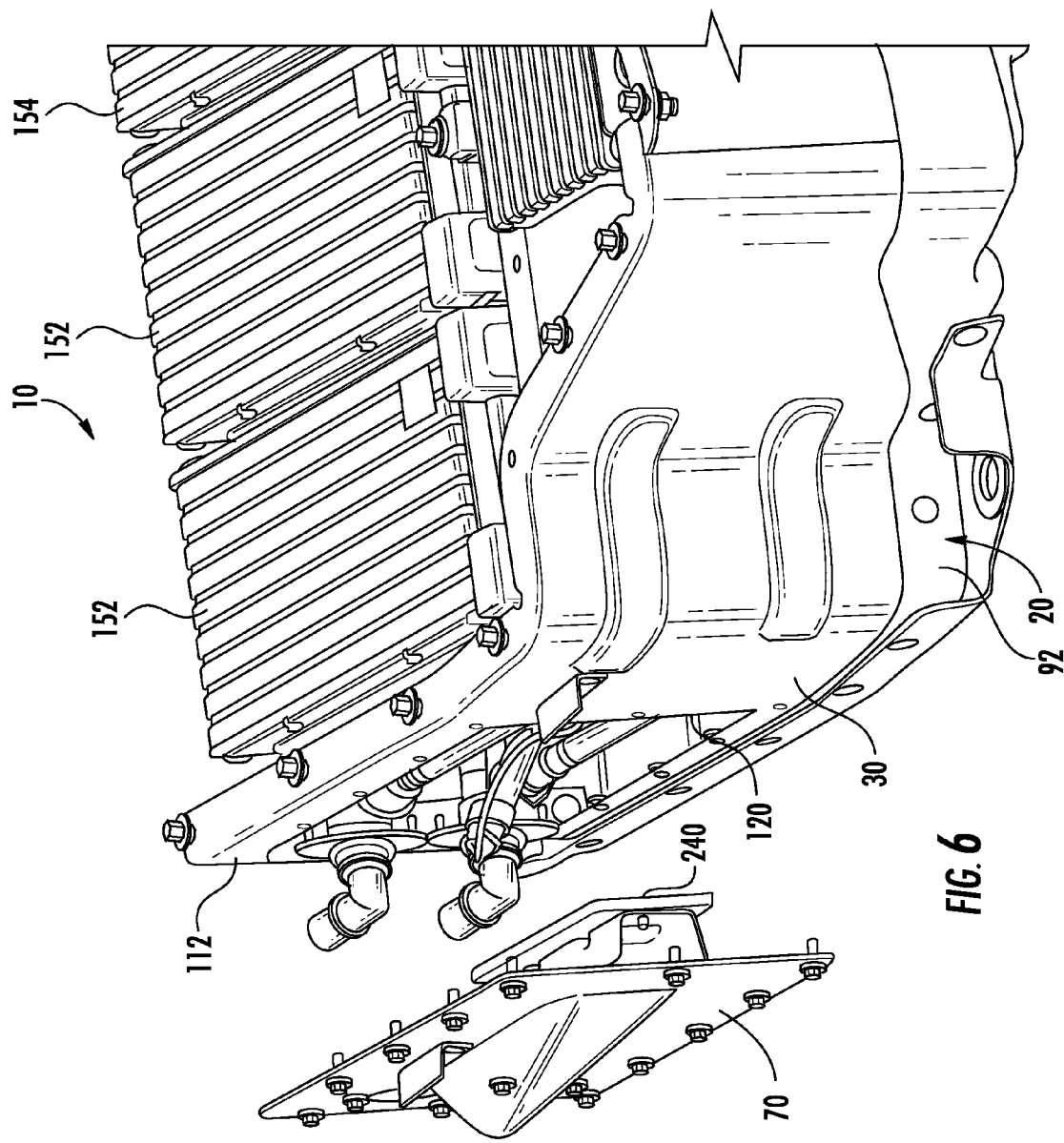
FIG. 6 is a schematic of a portion of the battery pack of FIG. 2 illustrating a second mounting bracket before being coupled to a peripheral side wall.
Figure 7:
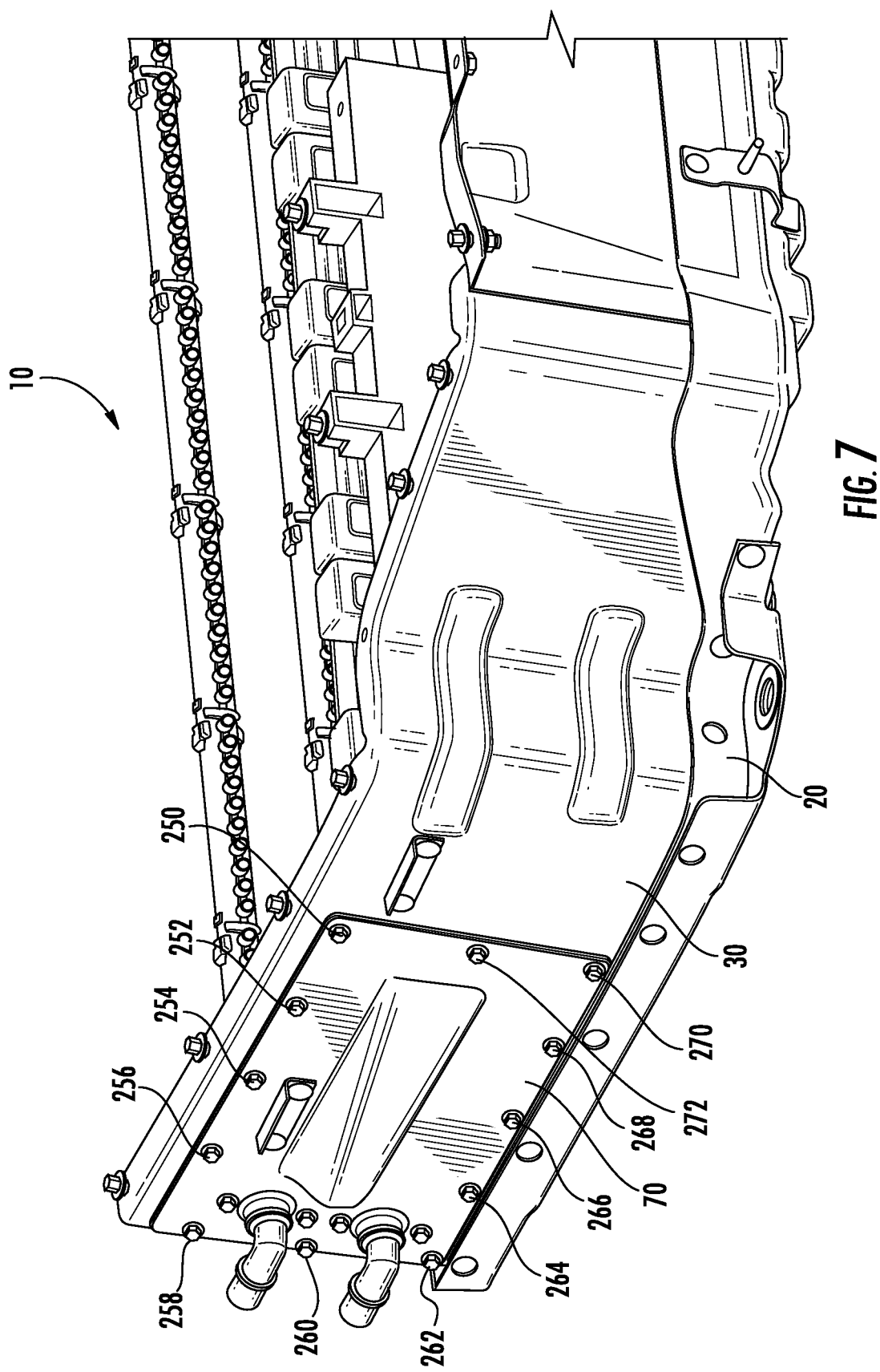
FIG. 7 is a schematic of a portion of the battery pack of FIG. 2 illustrating the second mounting bracket coupled to the peripheral side wall.
Figure 8:
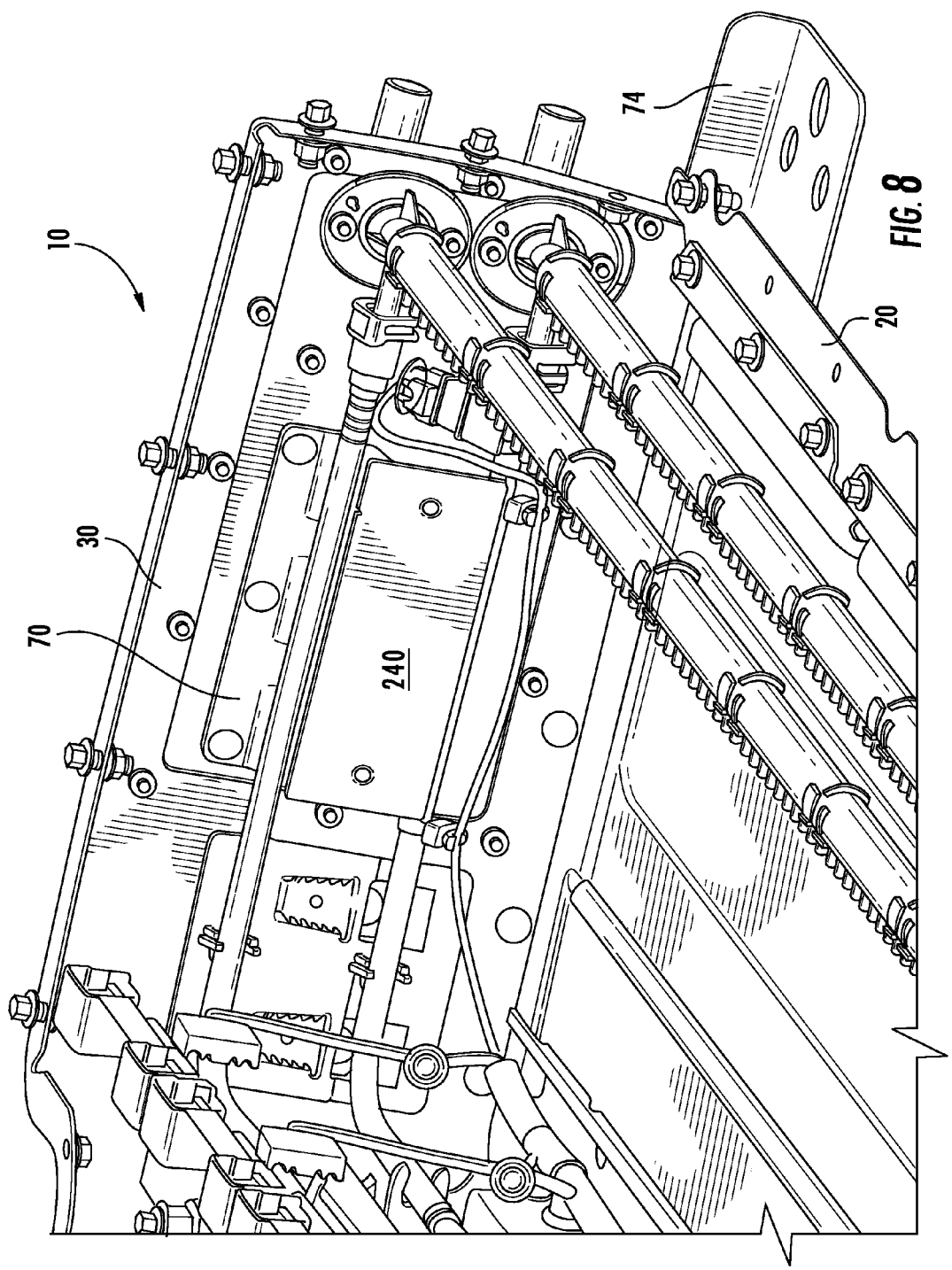
FIG. 8 is a schematic of a portion of the battery pack of FIG. 2 illustrating a portion of the second mounting bracket of FIG. 7 extending through the peripheral side wall.
Figure 9:
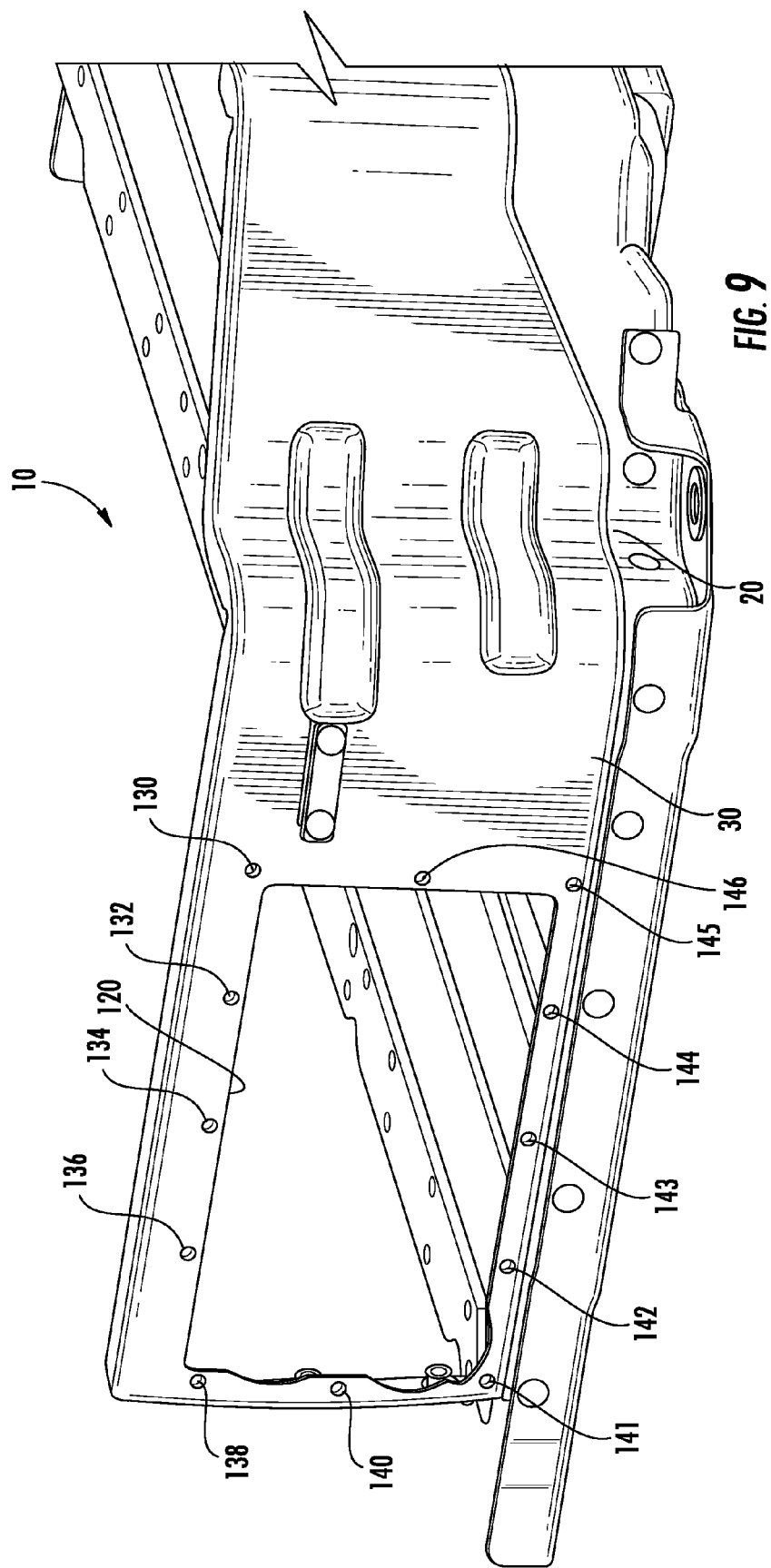
FIG. 9 is a schematic of a portion of the peripheral wall of the battery pack of FIG. 1 having an aperture for receiving a portion of the second mounting bracket therethrough.
Figure 10:
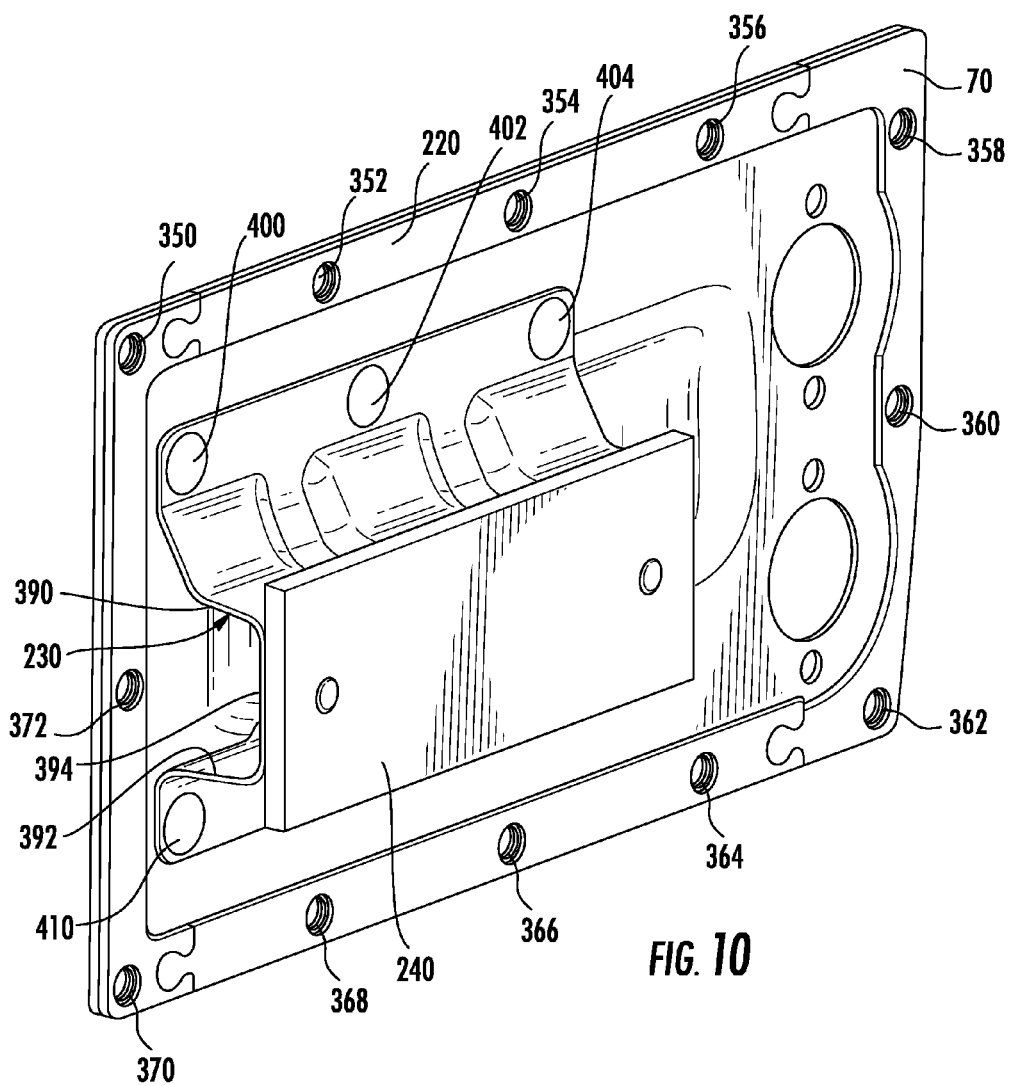
FIG. 10 is a schematic of the second mounting bracket.

Referring to FIGS. 1-9, a battery pack 10 in accordance with an exemplary embodiment is provided. The battery pack 10 includes a base plate 20, a peripheral side wall 30, a plurality of battery modules 40, a plurality of battery modules 50, a first mounting bracket 60, a second mounting bracket 70, vehicle securement brackets 72, 74, and a top cover plate 76. Referring to FIGS. 2, 6 and 7, an advantage of the battery pack 10 is that the battery pack 10 utilizes the second mounting bracket 70 which can be coupled to the peripheral side wall 30 after the plurality of battery modules 40 have been disposed on the base plate 20 to fixedly compress the plurality of battery modules 40 between the first mounting bracket 60 and the second mounting bracket 70 for securing the plurality of battery modules 40 in the battery pack 10.

Referring to FIGS. 2 and 4-6, the base plate 20 is provided to support the remaining components of the battery pack 10. In one exemplary embodiment, the base plate 20 is constructed of steel. Of course, in alternative embodiment, the base plate 20 could be constructed of other materials known to those skilled in the art such as plastic for example. The base plate 20 includes a bottom plate 90 and a peripheral extension 92 that is disposed around a portion of the periphery of the bottom plate 90 and extends outwardly from the bottom plate 90 substantially perpendicular to the bottom plate 90. The bottom plate 90 includes a first end 96 and a second end 98. Also, the bottom plate 90 includes a longitudinal axis 99.

Referring to FIGS. 4 and 6, the peripheral side wall 30 is configured to be coupled to the base plate 20 and extends upwardly from the base plate 20. The peripheral side wall 30 at least partially surrounds peripheral side surfaces of the plurality of battery modules 40. In one exemplary embodiment, the peripheral side wall 30 is constructed of steel. Of course, in an alternative embodiment, the peripheral side wall 30 could be constructed of other materials known to those skilled in the art such as plastic for example. The peripheral side wall 30 includes a first side portion 110, a second side portion 112, a third side portion 114, a fourth side portion 116, and a fifth side portion 118 that are each coupled to the base plate 20. The first side portion 110 and the second side portion 112 are disposed at the first end 96 and the second end 98, respectively, of the bottom plate 90. The second side portion 112 includes an aperture 120 extending therethrough that is configured to receive at least a portion of the second mounting bracket 70 therethrough. The second side portion 112 further includes apertures 130, 132, 134, 136, 138, 140, 141, 142, 143, 144, 145, 146 extending therethrough for receiving respective screws therethrough.

Referring to FIG. 2, the plurality of battery modules 40 are disposed on the base plate 20 between the first and second ends 96, 98 of the base plate 20 along the longitudinal axis 99 of the base plate 20. The plurality of battery modules 40 include battery modules 150, 152, 154, 156, 158, 160, 162, 164. The plurality of battery modules 50 are also disposed on the base plate 20. The plurality of battery modules 50 include battery modules 180, 182. In one exemplary embodiment, the plurality of battery modules 40, 50 are lithium-ion battery modules are substantially box-shaped. Of course, in alternative embodiments, the plurality of battery modules 40, 50 could be other types of battery modules known to those skilled in the art.

Referring to FIGS. 2, 4 and 5, the first mounting bracket 60 is coupled to the first side portion 110 of the peripheral side wall 30 is configured to contact the battery module 164 of the plurality of battery modules 40. The first mounting bracket 60 has first and second leg portions 190, 192 and a contacting portion 194. The contacting portion 194 is disposed between the first and second leg portions 190, 192 and is substantially perpendicular to the first and second leg portions 190, 192. The first leg portion 190 is coupled to the first side portion 110 of the peripheral side wall 30 via the weld joint 200. The second leg portion 192 is coupled to the first side portion 110 via the weld joints 202, 204. In one exemplary embodiment, the first mounting bracket 60 is constructed of steel. Of course, in an alternative embodiment, the first mounting bracket 60 could be constructed of other materials known to those skilled in the art.

Referring to FIGS. 7-10, the second mounting bracket 70 has a plate portion 220, an extension portion 230 extending outwardly from the plate portion 220, and an elastomeric member 240 disposed on the extension portion 230. The plate portion 220 is configured to be coupled to an outer surface of the second side portion 112 such that the extension portion 230 extends through the aperture 120 in the second side portion 112 and the elastomeric member 240 contacts the battery module 150 of the plurality of battery modules 40 to fixedly compress the plurality of battery modules 40 between the first mounting bracket 60 and the second mounting bracket 70 along the longitudinal axis 99.

The plate portion 220 is substantially rectangular-shaped. The plate portion 220 has a size greater than a size of the aperture 120 extending through the second side portion 112 such that the plate portion 220 substantially covers the aperture 120. The plate portion 220 includes the apertures 350, 352, 354, 356, 358, 360, 362, 364, 366, 368, 370, 372 extending therethrough. The apertures 350, 352, 354, 356, 358, 360, 362, 364, 366, 368, 370, 372 are configured to be aligned with the apertures 130, 132, 134, 136, 138, 140, 141, 142, 143, 144, 145, 146 in the second side portion 112 such that screws 250, 252, 254, 256, 258, 260, 262, 264, 266, 268, 270, 272 respectively are disposed therethrough for coupling the plate portion 220 to the second side portion 112.

The extension portion 230 includes a first leg portion 390, a second leg portion 392, and a supporting plate portion 394. The supporting plate portion 394 is disposed between and coupled to the first and second leg portions 390, 392 and is substantially perpendicular to the first and second leg portions 390, 392. The first leg portion 390 is coupled to the plate portion 220 utilizing the weld joints 400, 402, 404. The second leg portion 392 is coupled to the plate portion 220 utilizing the weld joint 410 and two other weld joints (not shown). The elastomeric member 240 is disposed on and is coupled to the supporting plate portion 394. The elastomeric member 240 is configured to contact the battery module 150 (shown in FIG. 2) when the second mounting bracket 70 is coupled to the second side portion 112.

Referring to FIG. 4, the vehicle securement brackets 72, 74 are disposed on and coupled to a bottom surface of the base plate 20. The brackets 72, 74 are configured to allow the battery pack 10 to be mounted a vehicle frame.

Referring to FIGS. 2, 4 and 11, a flowchart of a method of securing the plurality of battery modules 40 in the battery pack 10 in accordance with another exemplary embodiment will now be described.

At step 500, an operator provides the battery pack 10 with the base plate 20, the peripheral side wall 30, the first and second mounting brackets 60, 70, and the top cover plate 76. The peripheral side wall 30 is coupled to the base plate 20 and extends upwardly from the base plate 20. The peripheral side wall 30 has first and second side portions 110, 112 disposed at first and second ends 96, 98, respectively, of the base plate 20. The second side portion 112 has the aperture 120 extending therethrough. The first mounting bracket 60 is coupled to the first side portion 110 of the peripheral side wall 30. The second mounting bracket 70 has the plate portion 220, the extension portion 230 extending outwardly from the plate portion 220, and the elastomeric member 240 disposed on the extension portion 230.

At step 502, the operator disposes the plurality of battery modules 40 on the base plate 20 between the first and second ends 96, 98 of the base plate 20 along the longitudinal axis 99 of the base plate 20 such that one of the plurality of battery modules 40 contact the first mounting bracket 60.

At step 504, the operator couples the second mounting bracket 70 to an outer surface of the second side portion 112 such that the extension portion 230 extends through the aperture 120 in the second side portion 112 and the elastomeric member 240 contacts another one of the plurality of battery modules 40 to fixedly compress the plurality of battery modules 40 against one another between the first mounting bracket 60 and the second mounting bracket 70 along the longitudinal axis 99.

At step 506, the operator couples the top cover plate 76 to a top portion of the peripheral side wall 30 to enclose the plurality of battery modules 40 within an interior region defined by the base plate 20, the peripheral side wall 30 and the top cover plate 76.

The battery pack 10 and the method for securing the plurality of battery modules 40 in the battery pack 10 provide a substantial advantage over other battery packs and methods. In particular, referring to FIGS. 6 and 7, an advantage of the battery pack 10 is that the battery pack 10 utilizes the second mounting bracket 70 which can be coupled to the peripheral side wall 30 after the plurality of battery modules 40 have been disposed on the base plate 20 to fixedly compress the plurality of battery modules 40 between the first mounting bracket 60 and the second mounting bracket 70.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
   a base plate, a peripheral side wall, and a top cover plate defining an interior region;
   the peripheral side wall coupled directly to the base plate and extending upwardly from the base plate, the peripheral side wall having first and second side portions disposed at first and second ends, respectively, of the base plate, the second side portion having an aperture extending therethrough;
   a plurality of battery modules disposed on the base plate between the first and second ends of the base plate along a longitudinal axis of the base plate and within the interior region;
   a first mounting bracket coupled directly to an inner surface of the first side portion of the peripheral side wall and extending into the interior region toward the second side portion, the inner surface of the first side portion of the peripheral side wall defining a portion of the interior region, a vertical height of the first side portion being greater than a vertical height of the first mounting bracket, the first mounting bracket contacting a first battery module of the plurality of battery modules; and
   a second mounting bracket having a plate portion, an extension portion extending outwardly from the plate portion, and an elastomeric member disposed on the extension portion; the plate portion of the second mounting bracket being coupled to an outer surface of the second side portion, and the extension portion extending through the aperture in the second side portion and into the interior region; and the elastomeric member contacting a second battery module of the plurality of battery modules within the interior region to fixedly compress the plurality of battery modules between the first mounting bracket and the second mounting bracket along the longitudinal axis; and
   the top cover plate being coupled to a top portion of the peripheral side wall.

2. The battery pack of claim 1, wherein each battery module of the plurality of battery modules is box-shaped and is disposed adjacent to at least one other battery module of the plurality of battery modules on the base plate.

3. The battery pack of claim 1, wherein the first mounting bracket has first and second leg portions and a contacting portion, the contacting portion being disposed between the first and second leg portions and being perpendicular to the first and second leg portions, the first and second leg portions being coupled to the first side portion of the peripheral side wall via first and second weld joints, respectively.

4. The battery pack of claim 1, wherein the plate portion of the second mounting bracket has a plurality of apertures extending therethrough configured to receive a plurality of screws therethrough for coupling the plate portion to the outer surface of the second side portion.

5. The battery pack of claim 1, wherein the plate portion of the second mounting bracket has a size greater than a size of the aperture extending through the second side portion such that the plate portion substantially covers the aperture.

6. The battery pack of claim 1, wherein the extension portion of the second mounting bracket has first and second leg portions and a supporting plate portion, the supporting plate portion being disposed between the first and second leg portions and being perpendicular to the first and second leg portions, the first and second leg portions being coupled to the plate portion of the second mounting bracket via first and second weld joints, respectively.

7. The battery pack of claim 1, wherein the first mounting bracket has a contacting portion contacting the first battery module of the plurality of battery modules, the contacting portion being parallel to the plate portion of the second mounting bracket.

8. The battery pack of claim 1, wherein the peripheral side wall is constructed of steel.

9. A method of securing a plurality of battery modules in a battery pack, comprising:
   providing the battery pack with a base plate, a peripheral side wall, a top cover plate, and first and second mounting brackets; the base plate, the peripheral side wall, and the top cover plate defining an interior region; the peripheral side wall coupled directly to the base plate and extending upwardly from the base plate, the peripheral side wall having first and second side portions disposed at first and second ends, respectively, of the base plate, the second side portion having an aperture extending therethrough, the first mounting bracket coupled directly to an inner surface of the first side portion of the peripheral side wall and extending into the interior region toward the second side portion, the inner surface of the first side portion of the peripheral side wall defining a portion of the interior region, a vertical height of the first side portion being greater than a vertical height of the first mounting bracket, the second mounting bracket having a plate portion, an extension portion extending outwardly from the plate portion, and an elastomeric member disposed on the extension portion;
   disposing a plurality of battery modules on the base plate between the first and second ends of the base plate along a longitudinal axis of the base plate within the interior region such that a first battery module of the plurality of battery modules contacts the first mounting bracket; and
   coupling the second mounting bracket to an outer surface of the second side portion such that the extension portion extends through the aperture in the second side portion and toward the first side portion, the elastomeric member contacts a second battery module of the plurality of battery modules within the interior region to fixedly compress the plurality of battery modules between the first mounting bracket and the second mounting bracket along the longitudinal axis; and
   coupling the top cover plate to a top portion of the peripheral side wall.

10. The method of claim 9, wherein coupling the second mounting bracket to an outer surface of the second side portion comprises:
    disposing a screw through an aperture in the plate portion of the second mounting bracket and an associated aperture extending through the second side portion.

11. The battery pack of claim 1, wherein a width of each of the first and second side portions of the peripheral side wall in a first direction is greater than a width of each of the first and second battery modules of the plurality of battery modules in the first direction, the first direction being perpendicular to the longitudinal axis of the base plate.

12. The battery pack of claim 1, wherein a vertical height of the second side portion is greater than a vertical height of the second mounting bracket.

13. The method of claim 9, wherein a width of each of the first and second side portions of the peripheral side wall in a first direction is greater than a width of each of the first and second battery modules of the plurality of battery modules in the first direction, the first direction being perpendicular to the longitudinal axis of the base plate.

14. The method of claim 9, wherein a vertical height of the second side portion is greater than a vertical height of the second mounting bracket.

15. The method of claim 9, further comprising disposing the second mounting bracket along the longitudinal axis such that the extension portion of the second mounting bracket extends through the aperture in the second side portion toward the first side portion.

16. The method of claim 9, wherein the first mounting bracket has a contacting portion contacting the first battery module of the plurality of battery modules, and the method further comprises:

disposing the contacting portion of the first mounting bracket parallel to the plate portion of the second mounting bracket such that the plurality of battery modules are fixedly compressed along the longitudinal axis by the first mounting bracket and the second mounting bracket.

* * * * *